United States Patent [19]
Bruce

[11] 3,990,535
[45] Nov. 9, 1976

[54] VIBRATION DAMPING DEVICE FOR LEVERS

[76] Inventor: Jimmie R. Bruce, 110 Val Wood Drive, Conroe, Tex. 77301

[22] Filed: Sept. 11, 1975

[21] Appl. No.: 612,541

[52] U.S. Cl. .......................... 181/33 A; 181/33 K; 74/473 P
[51] Int. Cl.² ...................................... G10K 11/02
[58] Field of Search .............. 181/33 A, 33 G, 33 K; 74/473 P

[56] References Cited
UNITED STATES PATENTS

| | | | |
|---|---|---|---|
| 1,622,469 | 3/1927 | Scott | 181/33 A |
| 1,896,893 | 2/1933 | Hartsock | 74/473 P |
| 2,949,975 | 8/1960 | Plummer | 181/33 K |
| 3,130,700 | 4/1964 | Peterson | 181/33 G |
| 3,406,586 | 10/1968 | Hobbins | 74/473 P |
| 3,732,746 | 5/1973 | Fitzpatrick | 74/473 P X |
| 3,800,909 | 4/1974 | Duncanson et al. | 181/33 A |

Primary Examiner—Lawrence R. Franklin
Attorney, Agent, or Firm—Wayland D. Keith

[57] ABSTRACT

This vibration damping device is of a character to minimize the shaking or vibrating of levers, particularly gear shift levers on heavy trucks and other heavy machinery, which when operated over rough terrain at high speed, creates a noise that becomes almost unbearable, resulting in great fatigue on the part of the operator. The present arrangement utilizes an aggregate, shot, or a metallic material within the compartments of a device which may be secured around the lever, as by a zipper, a draw string and tape, so that the sudden and high frequency vibrations are minimized and dampened without interfering with the operation of the gear shift lever. The compartments of the device are divided longitudinally to maintain the aggregate or shot evenly distributed longitudinally. The compartments are also divided transversely, so when fastened around a gear shift lever, they will form circumferential pockets. The device is easily mounted on a gear shift lever and may be removed in a minimum of time.

10 Claims, 4 Drawing Figures

U.S. Patent  Nov. 9, 1976  3,990,535
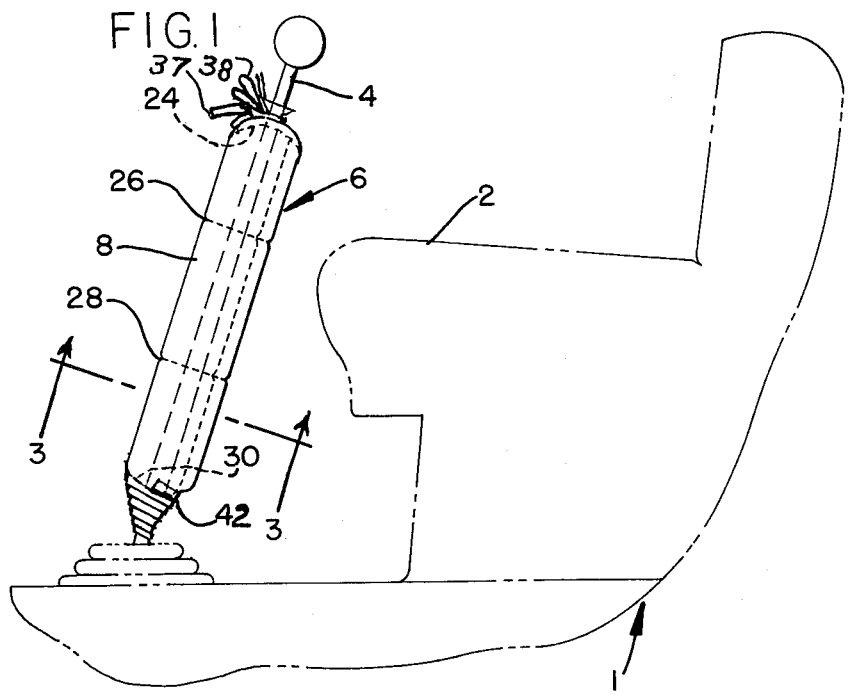
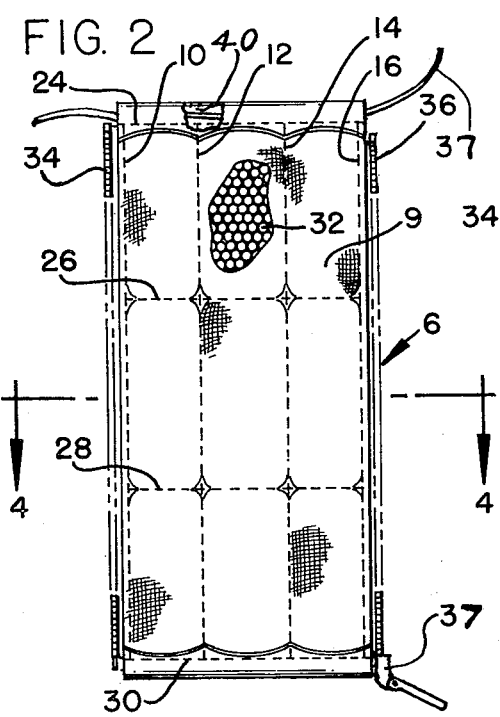
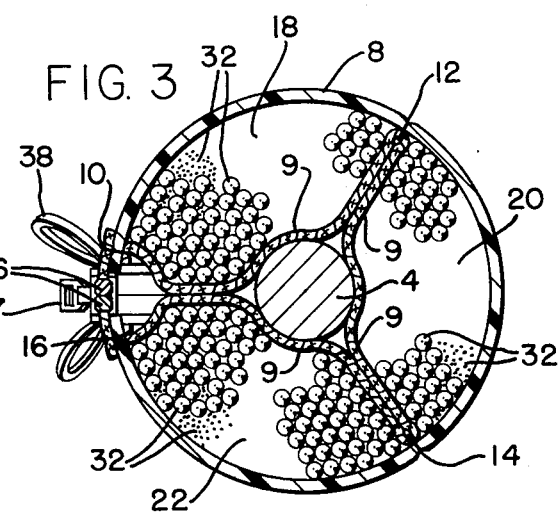
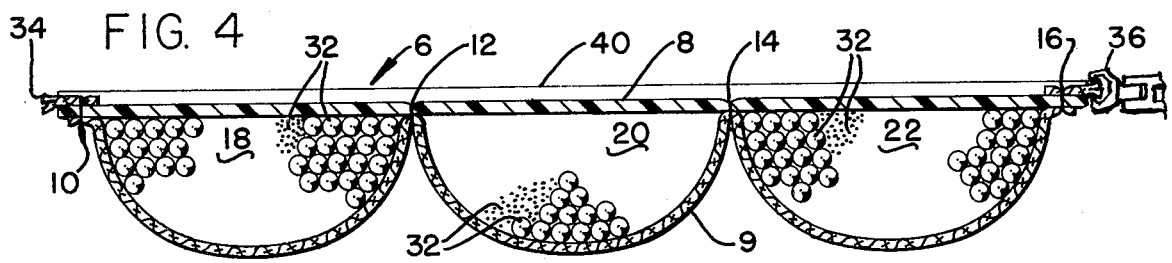

VIBRATION DAMPING DEVICE FOR LEVERS

BACKGROUND OF THE INVENTION

This invention relates to a vibration damping device, and more particularly to a vibration damping device or anti-rattle device for use on a vibrating arm lever of operating machinery, such as a gear shift lever of a vehicle, such as a truck, or an arm used in conjunction with machinery.

Since transmissions are mounted on the frame of a truck but are connected by a drive shaft to the wheels of the truck the vibrations of both the motor of the truck and the vibrations of the vehicle, caused by the wheels moving over the irregular terrain, coupled with the high speed at which the gears, transmission and differential are running, the rattle or noise created by the vibration imparted to the gear shift lever is such as to be most distracting, and annoying to the driver of the vehicle, which can result in great fatigue and thereby cause inefficiency in the operation of the vehicle, and therefore the safety of operation of the vehicle.

The above is particularly true of heavy trucks and tractors, when operated over long distances. The high frequency noise created by the vibration may bring on a type of hypnosis brought on by fatigue, which is a very dangerous state.

Prior Art

| | | |
|---|---|---|
| U.S. No. 3 304 043 | Beck | 2-14-67 |
| U.S. No. 3 314 631 | Whitehill | 4-18-67 |
| U.S. No. 3 323 609 | Bosenberger et al | 6-6-67 |
| U.S. No. 3 653 625 | Plice | 4-4-72 |
| U.S. No. 3 723 746 | Fitzpatrick | 5-15-73 |

BRIEF SUMMARY OF THE INVENTION

The present invention is directed toward alleviating or minimizing vibrations, noise and rattle of the gear shift lever of a vehicle, or other operating parts of machinery.

The present device is so constructed as to present a compartmented receptacle having a plurality of pockets or sacks formed therein to receive a material of relatively high density, such as sand, shot, steel pellets or the like. When the device is in place on a gear shift lever or on the operating arm of a piece of machinery, the material within the compartments will be retained against any substantial lateral or longitudinal shifting. It is preferable to have the compartments or receptacles made onto a pliable plastic sheet, such as heavy gauge vinyl, which pockets may be formed adjacent each other longitudinally on the plastic sheet, furthermore, each longitudinal pocket is divided transversely into a plurality of pockets so as to restrain migration of the material contained within the pockets.

OBJECTS OF THE INVENTION

An object of the invention is to provide an anti-rattle or damping device to lessen and deaden the noise caused by vibrations of a lever, such as a gear shift lever of a truck or the like.

Another object of the invention is to provide a simple damping device to eliminate high frequency noises and rattles caused by moving levers.

Another object of the invention is to provide aggregate or shot filled compartments or pockets to detachably connect in snug fitting relation around a lever, such as a gear shift lever of a truck, to minimize the rattle and vibration thereof.

A further object of the invention is to provide an anti-rattle or damping device which is simple in construction, easy to install and remove from the lever and low in cost of manufacture.

BRIEF DESCRIPTION OF THE DRAWINGS

With these objects in mind and others which will become manifest as the description proceeds, reference is to be had to the accompanying drawings in which like reference characters designate like parts in the several views thereof, in which;

FIG. 1 is a fragmentary side elevational view of a portion of a vehicle shown in dot-dash outline showing the seat thereof in dot-dash outline, showing the anti-rattle or vibration damping device attached around a gear shift lever, which is shown in full and hidden outline, the damping device being shown in full outline therearound, with tape around the lower end of the vibration damping device and the gear shift lever;

FIG. 2 is a side view of the damping device shown apart from the gear shift lever, being shown in spread apart position and showing the zippered components along each side thereof, a draw string being shown on one end thereof;

FIG. 3 is an enlarged sectional view taken on the line 3—3 of FIG. 1, looking in the direction indicated by the arrows;

FIG. 4 is a sectional view taken on the line 4—4 of FIG. 2, looking in the direction indicated by the arrows;

DESCRIPTION OF THE PREFERRED EMBODIMENT

With more detailed reference to the drawing, in the preferred embodiment of the invention the numeral 1 designates generally a portion of the vehicle having a seat 2, the portion of the vehicle and the seat being shown in the drawing in dot-dash outline, FIG. 1. A transmission gear shift lever is shown at 4. A damping device 6 is preferably formed on an elongated outer sheet of flexible material 8, such as plastic, and has an inner sheet of flexible material 9, which may be of fabric or plastic, superposed thereover. Which sheets are secured together as by stitching, welding, cementing or other suitable means, as indicated at 10, 12, 14 and 16, to form longitudinal compartments 18, 20, and 22, each of which compartments is cross-stitched as indicated at 24, 26, 28 and 30, to divide each longitudinal compartment into compartments of lesser length. Each of the compartments is partially filled with a weighting material 32, such as shot, aggregate, sand or the like.

The sheet 8 has zipper components 34 and 36 along opposite longitudinal sides thereof, so when it is desired to install the damping device or anti-rattle device on a lever, such as a gear shift lever as shown in FIG. 1, the device is so placed as to surround the gear shift lever 4, then the interengaging portions of the zipper are engaged and the zipper slide 37 is moved from the position shown in FIG. 2 to the position shown in FIG. 1, in a manner well understood in the art of zipper fastenings, so as to bindingly engage sheet 8, with aggregate 32 contained within the compartments thereof, against gear shift lever 4.

A draw string 38 passes through a loop or tunnel portion 40 of the sheet 8, and when the damping or anti-rattle device 6 is in place, as shown in FIG. 1, the draw string 38 is pulled tight around the gear shift lever 4 to restrain the downward movement of the device 6.

The damping device 6 is filled with a weighting material such as aggregate in such manner that the lever vibrations are minimized and the noise of the vibrations is damped. Thus the fatigue and tension caused by the vibration and noise of the lever are relieved and the operator of the machinery is much more efficient in the operation of the truck or other machinery.

After the compartments are filled with shot or aggregate material as shown in FIGS. 2 and 4, the device is positioned around the gear shift lever 4 and the slide 37 is fitted on the mated zipper components 34 and 36 and the slide is moved upward therealong to position as shown in FIG. 1 and the draw string 38 is securely tied around the upper end of the flexible material 8 and 9. The lower end of the damping device 6 is wrapped with an adhesive type tape as indicated at 42 so as to join with the lower end of the gear shift lever 4. In so doing, a damping device is held securely around the gear shift lever 4 due to it's weighted mass, it will not vibrate as readily as before the damping device 6 is applied.

What is claimed is:

1. A damping device for a vibrating lever, which device comprises;
   a. an elongated outer sheet of flexible material,
   b. an elongated inner sheet of flexible material, superposed thereover,
   c. means securing said inner sheet and said outer sheet of flexible material together at spaced apart longitudinal and transverse intervals to form compartments,
   d. weighting material at least partially filling each said compartment,
   e. fastening means securing the longitudinal sides of said inner and said outer sheets together so as to surround a lever.

2. A damping device as defined in claim 1; wherein
   a. at least one of said sheets of material is plastic.

3. A damping device as defined in claim 1; wherein
   a. both of said sheets of material are plastic.

4. A damping device as defined in claim 1; wherein
   a. said means for securing said inner and outer sheets of material together in spaced apart, transverse intervals is by welding.

5. A damping device as defined in claim 1; wherein
   a. said means for securing said inner and said outer sheets of material together at spaced apart longitudinal and transverse intervals is by stitching.

6. A damping device as defined in claim 1; wherein
   a. said weighting material is a metallic substance.

7. A damping device as defined in claim 1; wherein
   a. said weighting material is shot.

8. A damping device as defined in claim 1; wherein
   a. said weighting material is sand.

9. A damping device as defined in claim 1; wherein
   a. said fastening means securing the longitudinal sides of said outer sheet together is a separable fastening means.

10. A damping device as defined in claim 1; wherein
    a. said fastening means securing the longitudinal sides of said outer sheet together is a separable zipper fastening means.

* * * * *